United States Patent [19]

Bankos et al.

[11] Patent Number: 5,469,978
[45] Date of Patent: Nov. 28, 1995

[54] CONDITION INDICATING SYSTEM FOR RAILWAY CAR CUSHIONING UNIT

[75] Inventors: Kevin Bankos, York; Douglas J. Bingler, Camp Hill, both of Pa.

[73] Assignee: Keystone Railway Equipment Company, Inc., Mechanicsburg, Pa.

[21] Appl. No.: 273,727

[22] Filed: Jul. 12, 1994

[51] Int. Cl.⁶ .................................................. G01L 19/00
[52] U.S. Cl. ............................................ 213/223; 116/272
[58] Field of Search ................................... 213/223, 220, 213/43, 1 R; 200/81 R, 82 R, 82 D; 340/451, 452; 73/11.06, 37, 39; 116/272, 266

[56] References Cited

U.S. PATENT DOCUMENTS

| | | |
|---|---|---|
| 1,774,801 | 9/1930 | Macke et al. . |
| 2,686,445 | 8/1954 | Keck ................................................. 81/3 |
| 2,948,256 | 8/1960 | Tapp .............................................. 116/34 |
| 3,068,703 | 12/1962 | Morton ........................................... 73/419 |
| 3,584,596 | 6/1971 | Westcott et al. ............................. 116/70 |
| 3,743,109 | 7/1973 | Hutchison .................................. 213/223 |
| 3,934,238 | 1/1976 | Pavlou ......................................... 340/239 |
| 4,207,563 | 6/1980 | Soupal ......................................... 340/626 |
| 4,278,856 | 7/1981 | Owens ......................................... 200/82 |
| 4,583,085 | 4/1986 | Beller ........................................... 340/618 |
| 4,739,328 | 4/1988 | Koelle et al. ................................. 342/44 |
| 4,754,732 | 7/1988 | Kuczenski et al. ......................... 123/196 |
| 4,786,907 | 11/1988 | Koelle .......................................... 342/51 |
| 4,864,158 | 9/1989 | Koelle .......................................... 307/231 |
| 4,932,841 | 6/1990 | Havemann ................................... 200/82 |
| 5,030,807 | 7/1991 | Landt et al. .................................. 235/375 |
| 5,101,754 | 4/1992 | Bartscher et al. ........................... 116/34 |
| 5,119,066 | 6/1992 | Ballyns ........................................ 340/442 |
| 5,187,337 | 2/1993 | Fujie et al. ................................... 200/82 |
| 5,220,837 | 6/1993 | Silverwater ................................. 73/714 |
| 5,225,641 | 7/1993 | Weld et al. .................................. 200/82 R |
| 5,226,315 | 7/1993 | Bartscher et al. ........................... 73/48 |
| 5,233,142 | 8/1993 | Dunham ....................................... 200/83 |
| 5,237,957 | 8/1993 | Liucci .......................................... 116/267 |
| 5,243,158 | 9/1993 | Zimmermann .............................. 200/83 |
| 5,278,367 | 1/1994 | Homol ......................................... 200/83 |
| 5,284,061 | 2/1994 | Seeley et al. ................................ 73/746 |

FOREIGN PATENT DOCUMENTS

| | | |
|---|---|---|
| 0690444 | 9/1930 | France .................................. 200/82 R |
| 1129179 | 10/1968 | United Kingdom ................. 200/82 R |

OTHER PUBLICATIONS

Association of American Railroad Standard S–918–92. Manual of Standards and Recommended Practices, Effective Mar. 1, 1992.

Keystone Railway Equipment Co. Advertising Flyer, Sep., 1992.

"Smart Bolt" Articles: Hot Bearing Detection, 1990, ASME & On–Board Hot Bearing Detection System From Concept to Reality, GRSC, 1991.

*Primary Examiner*—Mark T. Le
*Attorney, Agent, or Firm*—Thomas Hooker

[57] ABSTRACT

A system for indicating whether a hydraulic—pneumatic cushioning unit mounted on a railway car to cushion impacts contains sufficient hydraulic fluid to cushion impacts includes a signal assembly mounted on the body of the cushioning device, the signal assembly unit including a pressure indicator and a signal unit which is removably mounted on the pressure indicator. A cable connects the signal unit to a radio mounted on the railway car. An actuator in the pressure indicator moves when sufficient hydraulic fluid is lost from the cushioning device to impair the ability of the device to cushion shocks. Movement of the actuator operates a switch or load cell in the assembly to send a signal through the cable to the radio which then broad-casts a signal indicating that the cushioning unit is inoperative. The signal unit is removably mounted on the pressure indicator to permit shipment of the cushioning unit without the relatively delicate signal unit and permit mounting of the signal unit, cable and radio on the railway car.

9 Claims, 7 Drawing Sheets

5,469,978

CONDITION INDICATING SYSTEM FOR RAILWAY CAR CUSHIONING UNIT

FIELD OF THE INVENTION

The invention relates to systems for indicating the condition of hydraulic—pneumatic cushioning units used to absorb impacts to the couplings of railway freight cars.

DESCRIPTION OF THE PRIOR ART

Hydraulic—pneumatic cushioning units are conventionally mounted on railway cars in order to absorb impacts to the car coupling. The impacts are absorbed by flowing hydraulic fluid in the cushioning units through apertures. Loss of hydraulic fluid from the units impairs the cushioning efficiency of the units with the risk that impacts are not absorbed but are transmitted directly to the railway cars and may injure lading on the cars. While cushioning units are highly reliable, hydraulic fluid will eventually leak from the interior of the cushioning units through seals surrounding the piston rods which extend outwardly of the units and are connected to couplings.

Conventionally, the condition of cushioning units is determined by visual inspection of the units. Inspection is difficult because the units are installed in chambers under the railway car floors located inwardly from the ends of the cars. Visual inspection may determine that the unit is "wet" with leaked hydraulic fluid. This determination does not, however, provide a positive indication that the unit cannot properly absorb impacts since initial loss of hydraulic fluid from the unit does not impair its cushioning capability.

Mechanical spring-type pressure indicators have been mounted in the ends of hydraulic-pneumatic cushioning units in order to permit tactile inspection of the units to determine whether the units contain sufficient hydraulic fluid for proper cushioning. The hydraulic fluid used in units of this type is pressurized by an inert gas which is charged into the interior chamber by the manufacturer. This gas compresses the hydraulic fluid which biases a spring backed pin in the pressure indicator outwardly of the cushioning unit. An inspector working under the railway car must find the pressure indicator, remove a protective cap, if used, and feel the position of the pin. If the pin is in a fully extended position, the unit contains sufficient hydraulic fluid to properly cushion impacts. However, if the pin is withdrawn then sufficient hydraulic fluid has leaked from the cushioning unit to impair the ability of the unit to cushion shocks. Tactile inspection of cushioning units installed under railway cars is a difficult and time-consuming procedure.

SUMMARY OF THE INVENTION

The disclosed invention is an improved system for remotely indicating whether or not a hydraulic—pneumatic cushioning unit installed on a railway freight car contains sufficient hydraulic fluid to absorb impacts. Each system includes a hydraulic—pneumatic cushioning unit, a signal assembly having a pressure indicator mounted on the cushioning unit with an actuator extending outwardly of the pressure indicator. The position of the actuator indicates whether or not the cushioning unit contains sufficient hydraulic fluid. The assembly includes a signal unit removably mounted on the exposed end of the pressure indicator and a switch or load cell shiftable by movement of the piston. The contacts of the switch or cell are connected to a cable extending from the signal unit to a radio transmitter mounted on the side of the railway car. A radio signal is broadcast by the transmitter when the switch or cell has shifted by loss of pressure and indicates that the cushioning unit does not contain sufficient hydraulic fluid to absorb impacts. The signal is transmitted during movement of the railway car along a railway track to a receiver mounted on the ground adjacent the railway track. In this way, the received radio signal from the car indicates that the cushioning unit on the car has insufficient hydraulic fluid to operate properly. If no signal is broadcast, the cushioning unit has sufficient hydraulic fluid and is operational. The broadcast radio signal also identifies the railway car on which the unit is mounted.

The pressure indicator is mounted on the cushioning unit during assembly of the cushioning unit at the manufacturer's shop. Hydraulic fluid and pressurized gas are charged into the interior of the unit. The cushioning unit is then shipped from the manufacturing plant to a remote location where it is mounted in the railway car. The pressure indicator is of rugged construction and is not injured during shipment of the cushioning unit. Cushioning units are large, heavy pieces of equipment and are shipped either on pallets or in banded bundles without the benefit of protective packaging.

The signal unit, cable and radio are permanently mounted on the frame of the railway car. Both the pressure indicator and signal unit are threaded to permit threadable engagement of the signal unit on the pressure indicator after the cushioning unit has been mounted on the railway car. In this way, the relatively delicate signal unit is attached to the cushioning unit only after the cushioning unit has been mounted in place on the railway car and is not exposed to potential damage during shipment of the cushioning unit or during the installation of the cushioning unit.

In the event the cushioning unit must be removed from the railway car for servicing, it is a simple matter to disconnect the signal unit from the pressure indicator and move the signal unit and end of the attached cable to a safe location on the railway car in order to permit removal of the cushioning unit from the railway car. The pressure indicator remains mounted on the cushioning unit at all times when the interior of the unit is pressurized.

Other objects and features of the invention will become apparent as the description proceeds, especially when taken in conjunction with the accompanying drawings illustrating the invention, of which there are seven sheets and two embodiments.

DESCRIPTION OF THE FIRST PREFERRED EMBODIMENT

Figure 2:
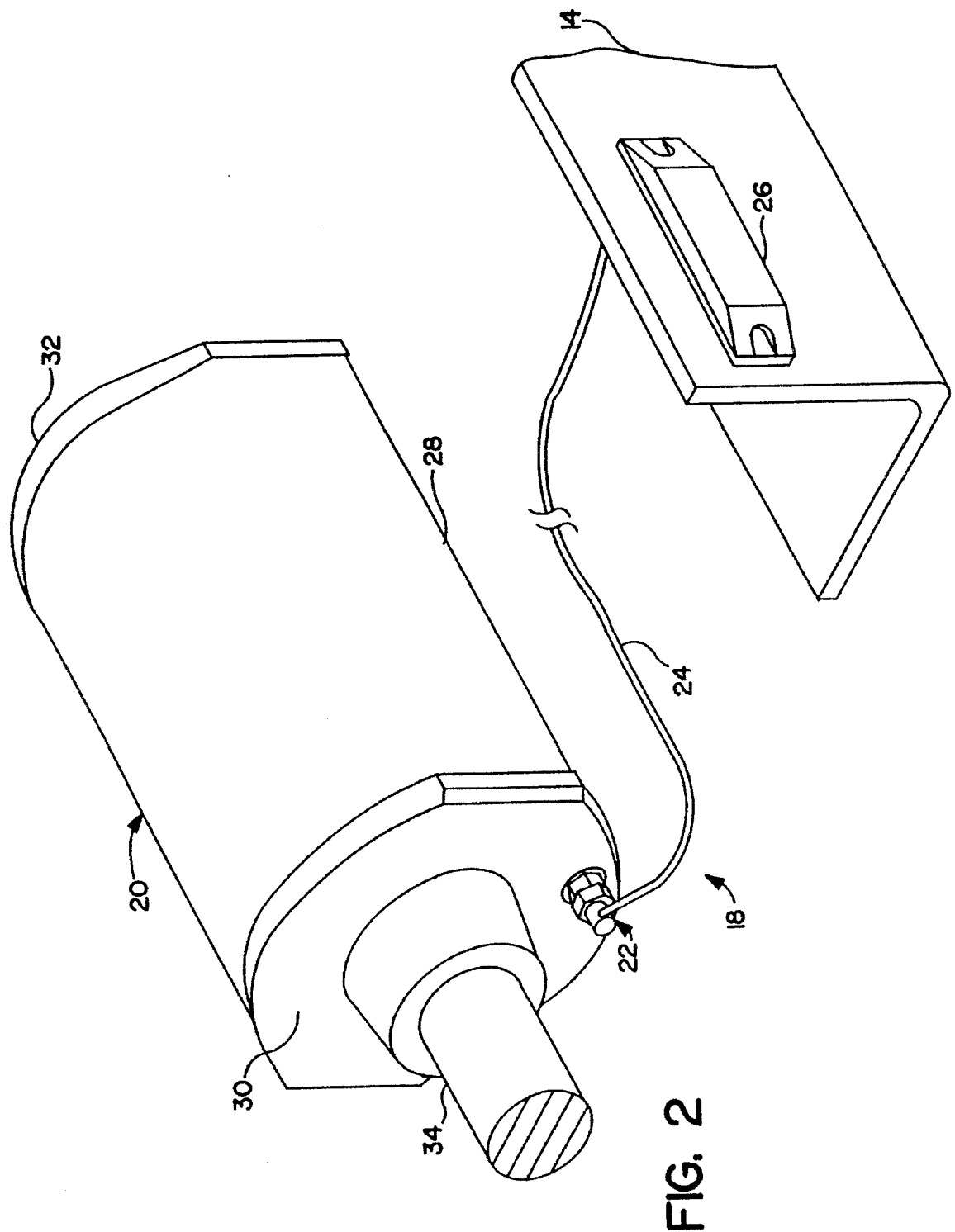
FIG. 2 is the perspective view of a condition indicating system shown in FIG. 1.

Railroad freight car 10 has a cargo supporting floor 12, frame 14 and is supported on wheels 16. Railway car cushioning system 18 is mounted at one end of the car. The system includes a hydraulic—pneumatic cushioning unit 20 mounted on the frame under floor 12, a signal assembly 22 mounted on the unit 20 as shown in FIG. 2, a cable 24 and a radio transmitter 26 mounted on the frame 14 on one side of the car 10. The cable extends from the signal assembly 22 to radio transmitter 26

The hydraulic cushioning unit 20 includes a generally cylindrical body 28 having a front head 30 and rear head 32 on opposite ends of the body. The body defines an interior chamber. A piston is confined within the chamber and is connected to piston rod 34 which extends through a bore in front head 40. Railway car coupling member 36 is mounted on the free end of the piston 34. The interior cavity of the cushioning unit is charged with hydraulic fluid and pressurized gas through a filling port (not illustrated) mounted in front head 30. The hydraulic—pneumatic cushioning unit 20 absorbs shocks and impacts to the coupling member in order to protect the cargo or lading carried by car 10. Unit 20 may utilize either a spring return or pressurized gas return for moving the piston back toward the front head after absorption of an impact.

Figure 3:
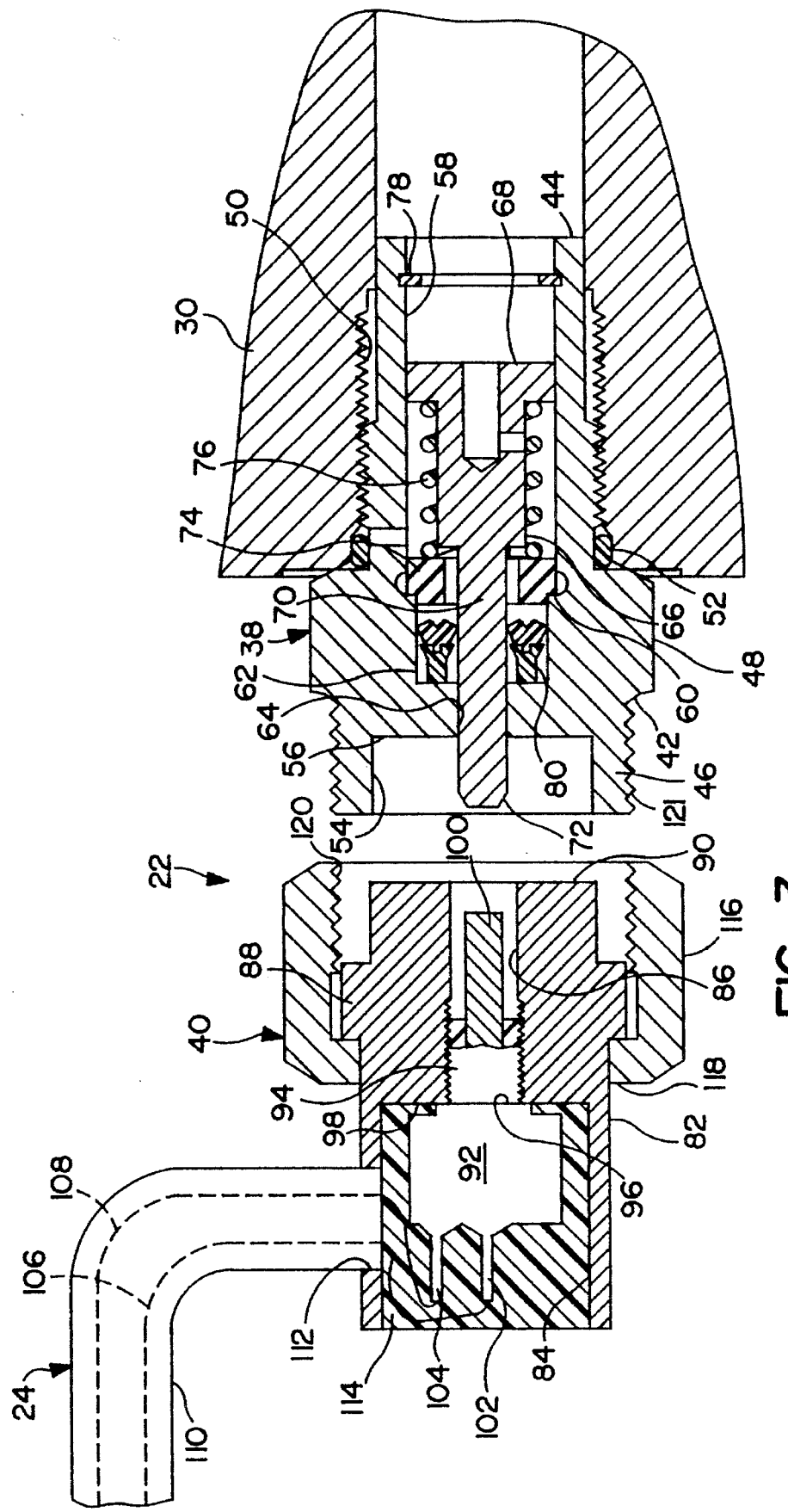
FIG. 3 is a sectional view, partially broken away, taken through a disassembled signal unit assembly.

The signal assembly 22 is mounted on the front head and is in communication with the pressurized hydraulic fluid in the interior chamber. Signal assembly 22 includes a pressure indicator 38 mounted in cushioning unit front head 30 as shown in FIG. 3 and a signal unit 40 mounted on one end of cable 24. Unit 40 is removably attached to the pressure indicator.

The pressure indicator 38 includes a tubular body 42 having a threaded cylindrical inner end 44 and threaded outer end 46. Hex head 48 is located between the ends to permit attaching a tool to the body and threadably mounting the body in threaded bore 50 extending through cushioning unit front head 30. The inner end of bore 50 communicates with the interior chamber so that pressurized hydraulic fluid is flowed through the bore to the pressure indicator. An O-ring 52 surrounds the body inwardly of hex head 48 and forms a seal between the body 42 and front head 30 to prevent leakage of pressurized hydraulic fluid from the interior chamber. Enlarged recess 54 is located on the outer end 46 of body 42. The bottom of the recess forms outwardly directed face 56.

A large diameter bore 58 extends from the inner end of body 42 past step 60 to face 62 which is located a short distance inwardly from face 56. Small diameter bore 64 extends between faces 56 and 62. Piston 66 is movably mounted in bores 58 and 64 and includes a head 68 slidably mounted in bore 58 and a small diameter pin actuator 70 slidably mounted in bore 64. The contact end 72 of actuator 70 faces the signal unit 40 when mounted on the pressure indicator 38. Metal spring retention washer 74 is seated on step 60 with actuator 70 extending freely through the center of the washer. A coil spring 76 is confined between the spring retention washer and head 68 of piston 66 to bias the piston inwardly or toward the pressurized interior chamber in the cushioning unit 20. Snap ring 78 is fitted in a groove in the inner end of bore 56 to confine the piston in place. Seal washer 80 i fitted in the outer end of bore 58 at face 62 and forms a pressure seal between the bore and actuator 70 to prevent leakage of pressurized hydraulic fluid through the pressure indicator.

Figure 4:
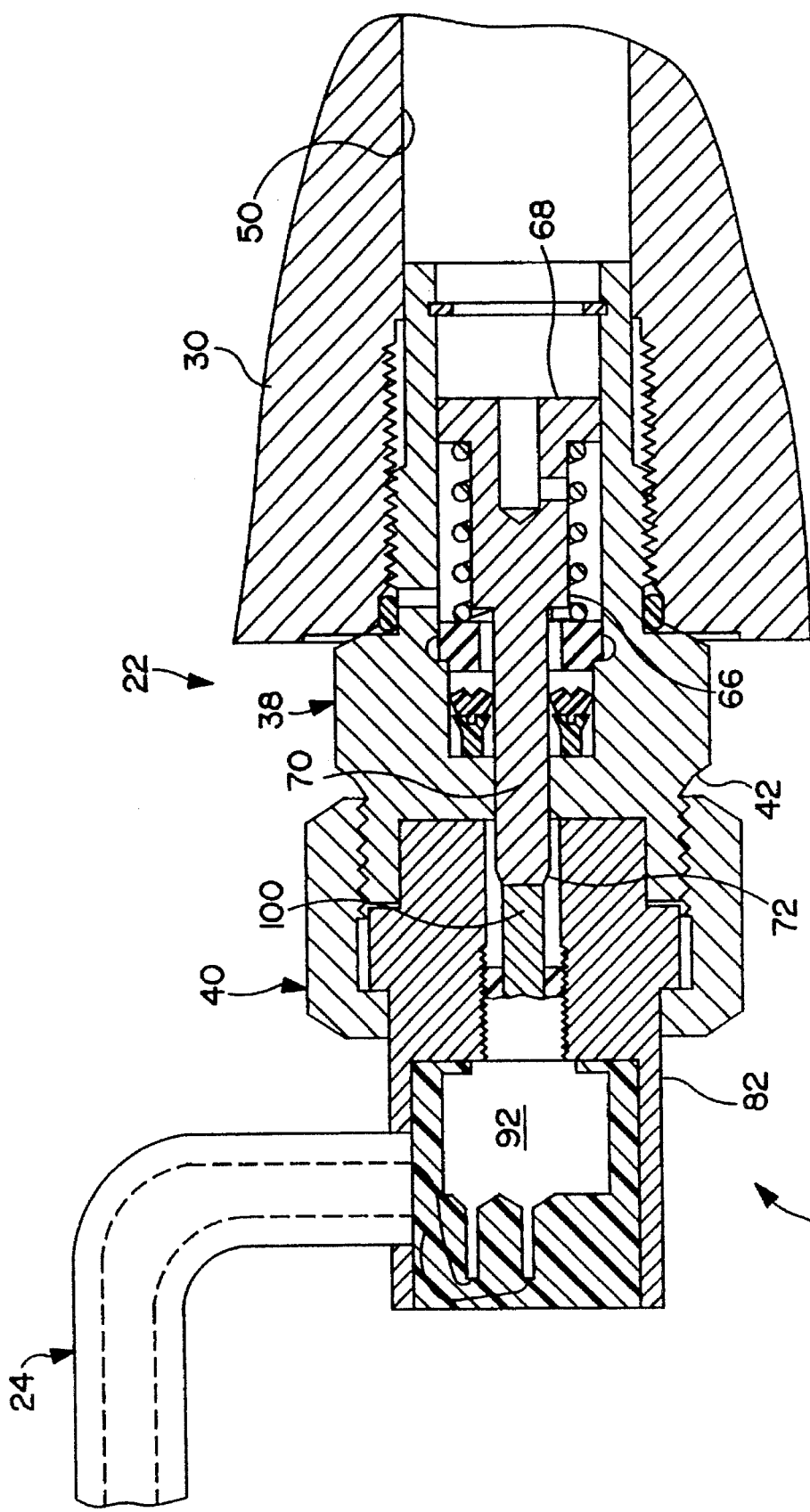
FIG. 4 is a sectional view like the sectional view shown in FIG. 3, taken through an assembled assembly.

The signal unit 40 includes a generally cylindrical body 82 having an enlarged recess 84 formed in the end of the body away from pressure indicator 38 and a small diameter bore or passage 86 extending from the recess to the end of the body adjacent the pressure indicator. The end of bore 86 adjacent recess 84 is threaded. A mounting ring 88 is provided on the exterior of body 82 and overlies bore 86. As illustrated in FIG. 4, when the unit 40 is mounted on indicator 38, bore 86 is in alignment with pin actuator 70 and has a diameter slightly greater than the diameter of the actuator to permit free movement of the contact end of the actuator in the bore. At this time, the lead end 90 of body 82 is seated within recess 54 and is held flush against face 56.

Figure 5:
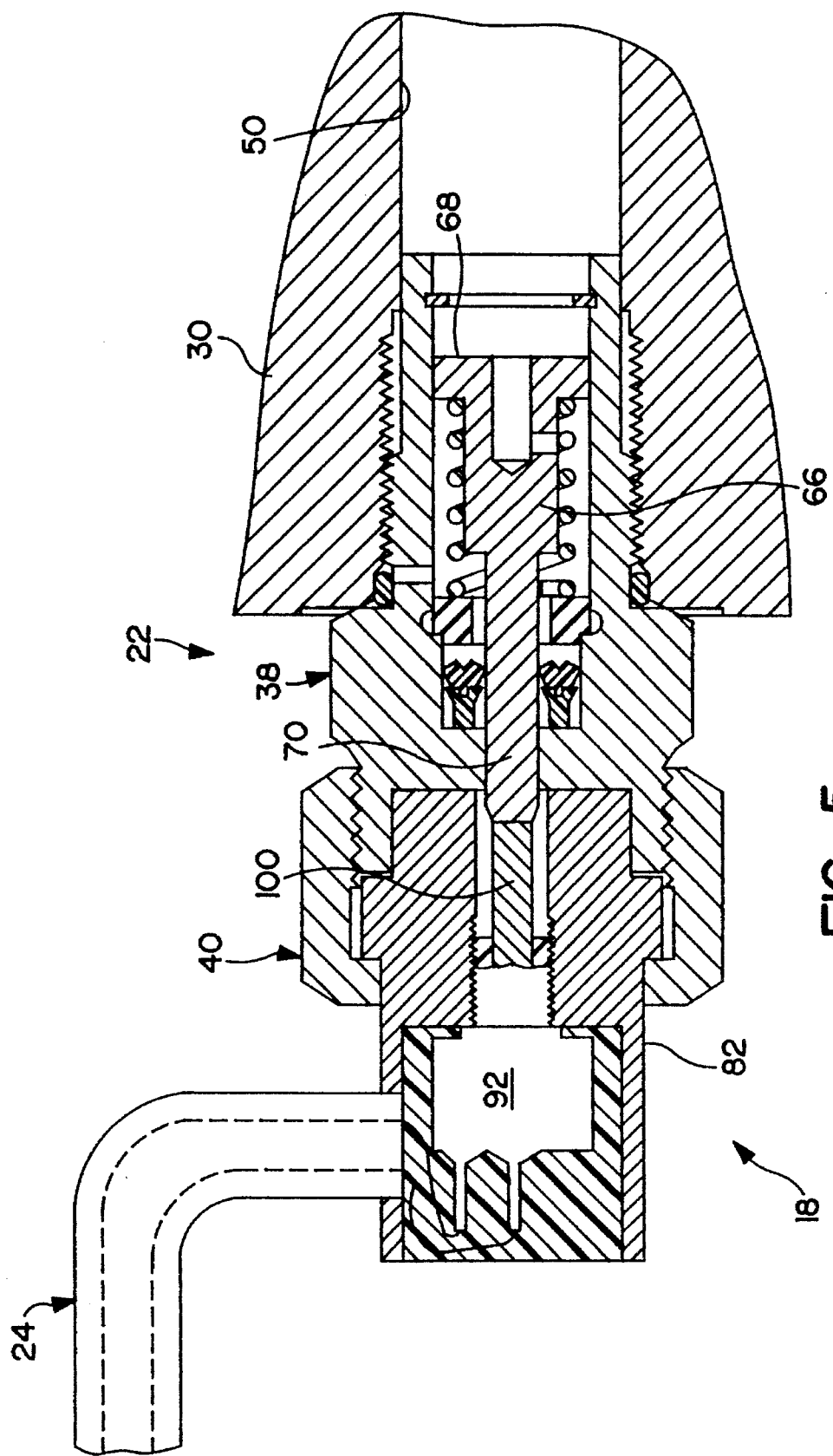
FIG. 5 is a sectional view like the sectional view shown in FIG. 4 in which the pressure of the hydraulic fluid in the cushioning unit has been reduced.

Electric switch 92 is fitted in recess 84 and includes a threaded neck 94 which engages the threads in bore 86 so that the shoulder 96 at the base of the neck is held flush against the bottom 98 of recess 84 to accurately locate the switch in body 82. The switch includes a movable contact pin or plunger 100 extending outwardly from neck 94 and into the bore 86. A light spring in the switch (not illustrated) biases the plunger 100 outwardly of the switch so that the plunger is held in engagement with the contact end 72 of actuator 70 when the indicator and unit are assembled as shown in FIGS. 4 and 5. The diameter of plunger 100 is less than the diameter of bore 86 to permit free movement of the plunger in the bore. FIG. 3 shows disassembled assembly 22 with the unit 40 free of indicator 38. In this position, the spring in switch 92 has fully extended plunger 100 into bore 86. The free end of the plunger is located below body end 90 to prevent accidental injury to the plunger and switch when the indicator and unit are disassembled.

Switch 92 includes two terminals 102 and 104 which are connected to individual conductors 106 and 108 in cable 24. Terminals 102 and 104 are connected to the contacts of switch 92. Conductors 106 and 108 are connected to the contacts of switch 92. Cable 24 includes an outer protective sheath 110 which protects the conductors from injury. The cable is suitably attached to the railway car between the unit 40 and radio transmitter 26. A portion of the cable adjacent the signal unit is free of car 10 to permit movement of the unit into and out of engagement with the pressure indicator 38.

The end of the cable 24 extends into an opening 112 formed through the side of body 82 adjacent recess 84. The recess 84 is filled with a potting material 114 to protect switch 92, the terminals and conductors in the recess.

A mounting collar 116 surrounds the end of the body 82 adjacent pressure indicator 38 and includes an interior lip 118 which extends behind ring 88. The interior of the collar 116 extending past ring 88 is threaded for engagement with the threads on the outer portion of indicator body 42.

The pressure indicator and signal unit are assembled to form signal assembly 22 by first positioning the unit 40 in axial alignment with the pressure indicator as shown in FIG. 3 and then moving the unit toward the indicator to seat the lead end 90 of body 82 into recess 54 so that the end rests flush on face 56. As illustrated in FIGS. 4 and 5, there is a slight space between the lead end of the indicator body and the step at the forward end of ring 88 to ensure that the lead end of the body is mounted flush on the face. The collar 116 is then rotated so that the interior threads 120 engage the threads 121 on the front portion 46 of body 42 to hold the indicator and unit together as illustrated. During mounting of the unit on the indicator, the lead or contact end 72 of pin actuator 70 extends freely into bore 86 and engages plunger 100.

When the indicator 38 and unit 40 are secured together to form assembly 22, and the cushioning unit is finally pressurized, the pressure of the hydraulic fluid in the interior chamber of unit 20 extends the piston 66 to the position of FIG. 4 against spring 76 and the piston depresses the plunger 100 to maintain the switch contacts in a closed position thereby preventing the transmitter from broadcasting a signal. The closed switch shorts out the transmitter. The absence of a signal transmitted by the radio indicates the presence of sufficient hydraulic fluid in the unit 20 to cushion shocks.

In the event the pressure of the hydraulic fluid in the interior chamber of the cushioning unit decreases, indicating a loss of hydraulic fluid sufficient to impair cushioning, the piston 66 shifts toward the right or inwardly of the interior chamber and the contact end 72 of actuator 70 is partially withdrawn from bore 86. The spring in the switch retains the plunger against the contact end of the actuator during movement of the piston. Initial withdrawal of the piston and corresponding movement of the plunger shifts the contacts in the switch to the open position, thereby preventing current from flowing through conductors 106 and 108 connected to the radio transmitter and permitting the transmitter to send a signal indicating that the cushioning unit cannot cushion shocks.

After cushioning unit 20 has been in use for many years, sufficient hydraulic fluid may have leaked out of the interior chamber to impair the cushioning ability of the unit. Leakage of hydraulic fluid increases the space in the interior chamber for the compressed gas and the pressure exerted by the gas on the fluid is correspondingly decreased. This decrease in pressure in the hydraulic fluid permits spring 76 to shift the piston 66 inwardly or to the position shown in FIG. 5. Initial inward movement of actuator 70 is followed by plunger 100. This initial movement of the plunger toward the cushioning unit opens the contacts in the switch to permit the radio transmitter to broadcast a signal, identifying the railway car and providing an indication that the cushioning unit in the car no longer contains sufficient hydraulic fluid to cushion impacts. The received radio signal is monitored to identify railway cars with cushioning units which must be reconditioned.

Cushioning units 20 are manufactured and charged with hydraulic fluid and pressurized inert gas at a manufacturer's plant. During manufacture, the pressure indicator 38 is threadably mounted in bore 50 to close the interior opening of the cushioning unit. A desired volume of hydraulic fluid is flowed into the interior volume of the cushioning unit and then pressurized inert gas, typically nitrogen, is flowed into the interior cavity in sufficient volume to pressurize the hydraulic fluid within the cavity to a charging pressure which may be as high as 600 psi. The liquid and gas are flowed into the chamber through the charging valve in front head 30.

Figure 1:
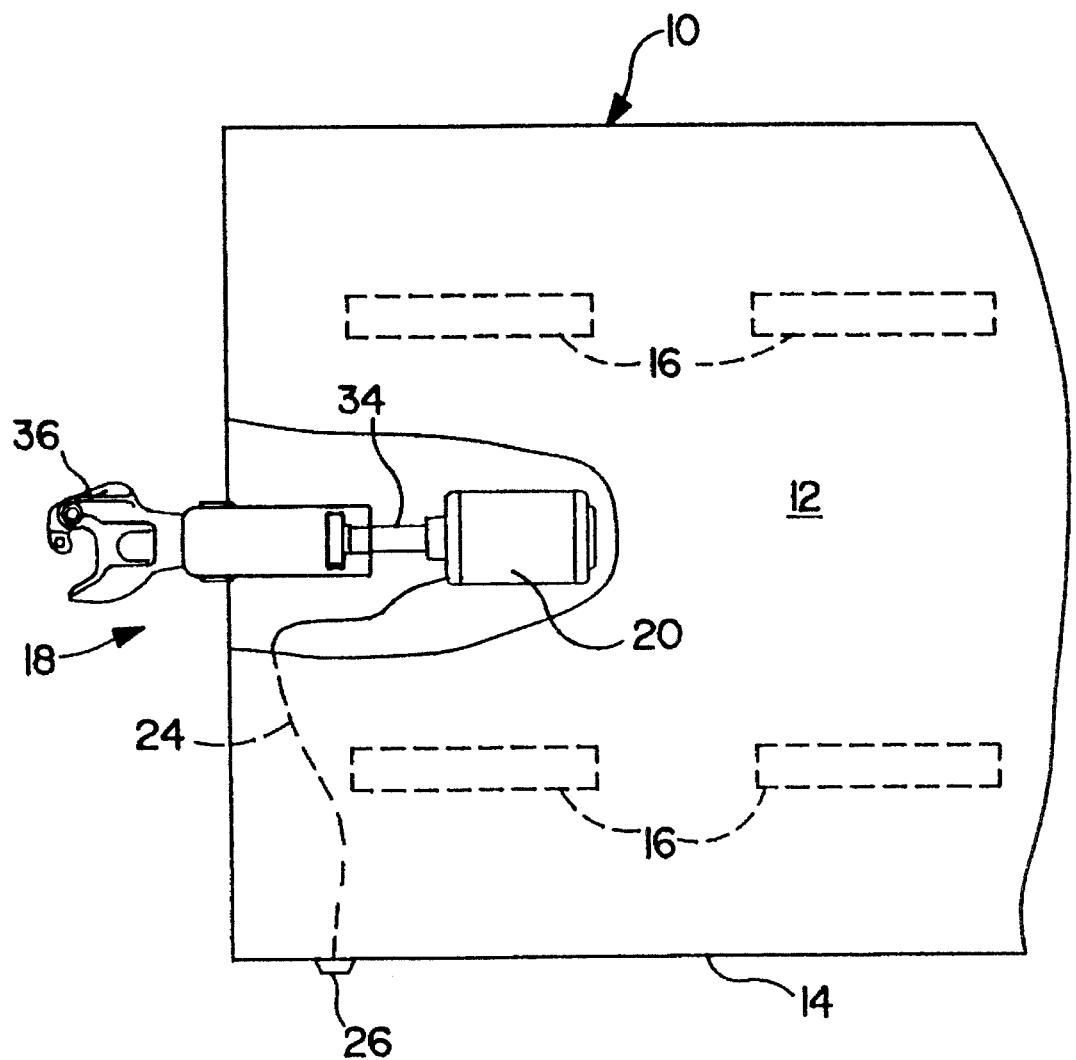
FIG. 1 is a top view, partially broken away, showing one end of the railway car with an indicating system.

After manufacture, the cushioning units are shipped to a plant where the units are mounted on railway cars, as shown in FIG. 1. The units may be mounted to railway cars in the shops of railway car manufacturers or may be mounted to railway cars at railway repair yards or other sites.

The large, heavy cushioning units are shipped from the manufacturer's shops to the installation site either on pallets or as part of a blocked and banded package made up of a number of units spaced apart by blocks and held together by surrounding steel bands. The cushioning units are not placed in protective containers. The units are very rugged in construction and withstand shocks and accidental contact during movement by lift trucks, railway cars and other vehicles used during transport. If desired, a protective cap may be fitted over or threaded on the exposed face of the pressure indicator 38 to protect the indicator during shipment.

The signal unit 40, cable 24 and radio transmitter 26 are permanently mounted on railway car 10 before or after the cushioning unit is mounted on the car. The unit 40 is removably mounted onto the pressure indicator of the cushioning unit after the cushioning unit has been mounted on the railway car. In this way, the relatively fragile signal unit is not attached to the cushioning unit during shipment from the manufacturer's shop to the installation site and is not exposed to potential injury due to rough handling or shocks which typically occur during shipment of the heavy and bulky cushioning unit.

Further, the permanent mounting of the signal unit, cable and radio on the railway car 10 permits ready disassembly of the signal unit from the cushioning unit in the event is necessary to remove the cushioning unit from the railway car for servicing. The signal unit may also be removed from the pressure indicator in order to facilitate manual inspection of the pressure indicator to ensure that the indicator is operating properly.

The hydraulic cushioning unit 20 is mounted on railway car 10 in a relatively inaccessible location beneath floor 12 and a distance inwardly from the adjacent end of the car. When mounted, the cushioning unit and attached unit 40 are protected from injury by the surrounding portions of the car. The cable 24 is preferably mounted on the railway car at locations where it is protected from injury during normal operation of the car.

Signal unit 40 has been described as including an on/off switch 92 in which the contacts in the switch are closed when the piston 66 is fully extended and there is sufficient pressurized hydraulic fluid in the cushioning unit to cushion impacts as shown in FIG. 4. The invention contemplates use of a switch in the signal unit in which the contacts are open when the piston is fully extended and there is sufficient hydraulic fluid in the cushioning unit to cushion impacts. In this case, inward shifting of the piston, indicative of loss of hydraulic fluid from the cushioning unit, closes the switch and sends a signal to the radio transmitter so that the transmitter then transmits a signal indicating a loss of hydraulic fluid.

Further, the signal unit may include a load cell as opposed to a switch with the load cell including a plunger as illustrated and a pair of load cell contacts such that movement of the plunger varies the resistance of the load cell contacts rather than opening or closing the contacts of a switch. Use of a load cell permits the radio transmitter 26 to broadcast a signal proportional to the position of the piston 66 which in turn is proportional to the actual pressure of the hydraulic fluid in the cushioning unit and indicative of the volume of the hydraulic fluid in the unit. The switch and load cell are electrical components each having a pair of contacts. The electrical conductivity between the contacts varies depending on the pressure in the cushioning unit.

The signal unit 40 is removably mounted on the pressure indicator 38 by a threaded connection. Other types of removable connections between the unit and indicator are contemplated and are within the scope of the invention. For instance, the unit may be mounted on the indicator by a bayonet-type connection or a connection in which the unit is secured on the indicator by a releasable latch or by a collar and tightening screw connection.

DESCRIPTION OF THE SECOND PREFERRED EMBODIMENT

Figure 6:
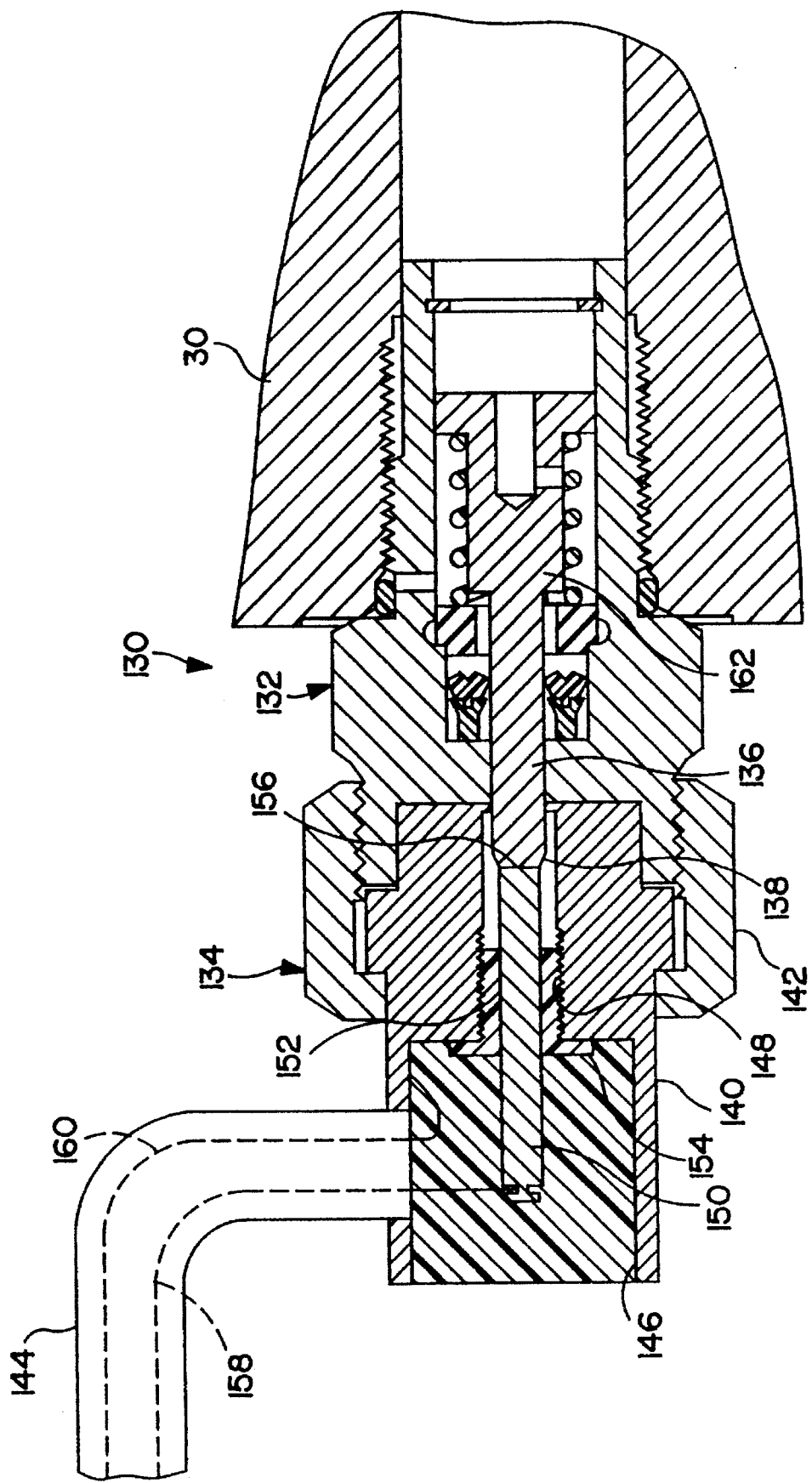
FIGS. 6 and 7 are like FIGS. 4 and 5 and illustrate a second embodiment of the invention.
Figure 7:
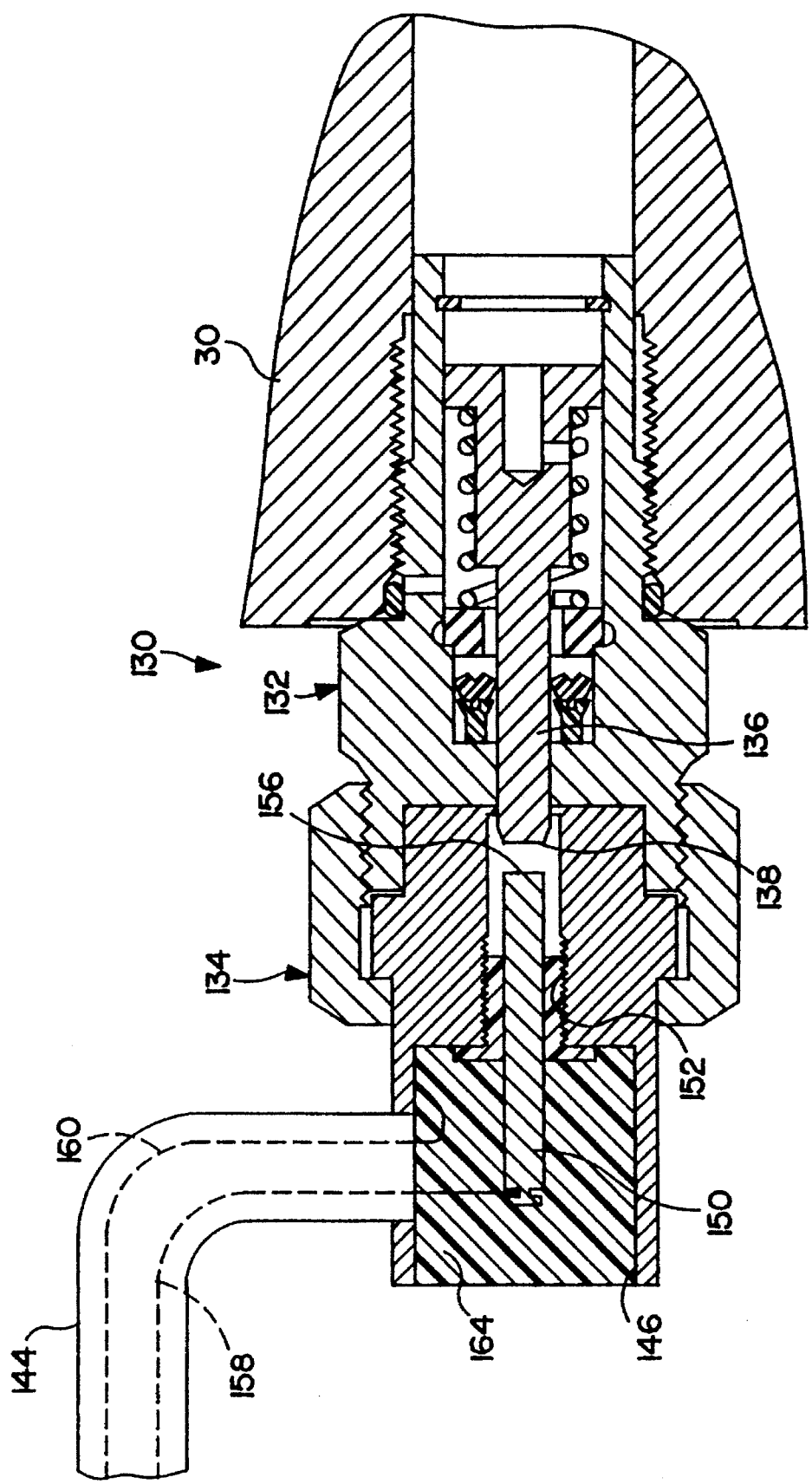

The second embodiment of the invention is illustrated in FIGS. 6 and 7 and includes a signal assembly 130 threadably mounted in the front head 30 of a hydraulic cushioning unit like previously described unit 20. The assembly includes a pressure indicator 132 which may be identical to previously described indicator 38 and a signal unit 134 which is removably mounted on the pressure indicator. The pressure indicator is threadably mounted on head 30 as shown and includes a pin actuator 136 having a switch contact end 138 extending outwardly of the recess on the exposed end of the indicator.

The signal unit 134 includes a body 140 like previously described body 82 and a mounting collar 142 like previously described collar 116. The collar permits releasable mounting of the signal unit on the pressure indicator as previously described in connection with the first preferred embodiment. One end of a two-conductor cable 144 is joined to the body 140. The body 140 includes a large recess 146 and a threaded small diameter bore 148 like recess 84 and bore 86, respectively. A stationary electrically conductive contact pin 150 extends through and is secured to a threaded insulating collar 152 having a circumferential flange 154. The pin and surrounding collar are threaded into the outer end of bore 148 so that the flange 154 is seated on the bottom of recess 146 to locate switch contact end 156 of the pin 150 in the bore 148 adjacent the switch contact end 138 of actuator 136. As illustrated in FIGS. 6 and 7, the pin 150 is secured in place in the signal unit 134 and does not move in bore 138.

Cable 144 includes a pair of conductors 158 and 160 like conductors 106 and 108. The remote ends of the conductors are connected to a radio transmitter (not illustrated) like transmitter 26 mounted on a railway car supporting the cushioning unit. The ends of the conductors 158 and 160 at signal unit 134 are connected, respectively, to a terminal at the end of pin 150 in recess 46 and to a terminal on the signal unit body 140. Collar 152 electrically isolates pin 150 from body 140.

The signal assembly 130 operates similarly to assembly 22 to provide an electrical connection or short circuit between conductors 158 and 160 when the cushioning unit is charged with hydraulic fluid at a sufficiently high pressure to cushion coupling impacts. This condition is shown in FIG. 6. The pressure of the hydraulic fluid moves the pin actuator 138 outwardly of the cushioning unit, as previously described, to hold the actuator switch contact end 138 against and in electrical engagement with the contact end 156 of the fixed contact pin 150. An electrical connection or short connection is formed between the conductors 158 and 160 through pin 150, actuator 136 and piston 162 of pressure indicator 132, the body of the pressure indicator and the body of the signal unit which is in electrical connection with conductor 160. This electrical connection prevents the radio transmitter from broadcasting a signal. The absence of a signal indicates that the cushioning unit is operational and will absorb cushioning shocks.

FIG. 7 illustrates the signal assembly 130 when the pressure of the hydraulic fluid in the cushioning unit has decreased sufficiently to permit the spring in the pressure indicator to shift piston 162 and move the contact end 138 out of engagement with the contact end of pin 150. In this circumstance, the electrical connection between conductors 158 and 160 is broken or open and the radio transmitter is activated to broadcast a signal identifying the railway car on which the cushioning unit is mounted and indicating that the cushioning unit is unable to cushion shocks properly.

The second embodiment signal assembly 130 functions in the same manner as the first embodiment assembly 22. In the first embodiment, the switch contacts are held closed when the hydraulic fluid in the cushioning unit is sufficiently pressurized. The contacts are moved into an open position in response to retraction of the pin actuator 70. In the second embodiment, the pin actuator 136 and pin 150 form a switch having contacts 138 and 156 which is closed during normal operation and open when the piston is retracted. Recess 146 is filled with potting material 164 to protect the ends of conductors 158 and 160 and the rear end of pin 150.

While we have illustrated and described preferred embodiments of our invention, it is understood that this is capable of modification, and we therefore do not wish to be limited to the precise details set forth, but desire to avail ourselves of such changes and alterations as fall within the scope of the following claims.

What we claim as our invention is:

1. A railway car cushioning system comprising,

A) a hydraulic—pneumatic cushioning device for cushioning a railway car, said device comprising a cushioning device body having an interior chamber, a device piston in the chamber, a piston rod connected to the device piston and extending outwardly of the cushioning device body, and hydraulic fluid and a pressurized gas in the chamber;

B) a pressure indicator mounted on said cushioning device body and located in communication with pressurized hydraulic fluid in the chamber, the pressure indicator including an indicator body, a movable member disposed in the indicator body including an exposed actuator pin and an indicator piston, a first switch contact on the actuator pin, a spring biasing the movable member toward the interior chamber, a seal between the movable member and indicator body, a first attachment member on the indicator body adjacent to the exposed actuator pin, a first electrical contact surface on the indicator body, the pressure indicator including a first electrical circuit path extending from the first electrical contact surface to the first switch contact; and C) a signal unit including a signal unit body, first and second terminals, a contact member, a second switch contact on the contact member, an insulator between the contact member the signal unit body, a second electrical contact surface on the signal unit body, a second electrical circuit path extending through the signal unit between a first terminal and the second electrical contact surface, and a third electrical circuit path extending through the signal unit from a second terminal to the second switch contact, a second attachment member on the signal unit body complimentarily engagable and disengagable with the first attachment member to mount the signal unit on the pressure indicator with the first and second electrical contact surfaces engaging each other and the second switch contact adjacent to the first switch contact such that movement of the movable member outwardly of the hydraulic—pneumatic cushioning device by pressurized hydraulic fluid moves the first switch contact into engagement with the second switch contact to form a closed electrical connection between said terminals.

2. A system as in claim 1 wherein said insulator surrounds the contact member.

3. A system as in claim 2 wherein the insulator comprises a bushing.

4. A system as in claim 1 including a radio transmitter adapted to be mounted on a railway car, and electrical connections joining the terminals to the radio transmitter.

5. A system as in claim 1 wherein said second contact is recessed within the signal unit body.

6. A system as in claim 5 wherein said actuator pin extends outwardly of the indicator body and into the signal unit body when the signal unit is mounted on the pressure indicator.

7. A system as in claim 1 wherein said signal unit body includes an end facing the pressure indicator when the signal unit is mounted on the pressure indicator and a bore extending into the signal unit body from said end, and wherein said contact member is recessed in the bore and the actuator pin extends into the bore.

8. A system as in claim 1 wherein said first and second attachment members form a threaded connection between the signal unit and the pressure indicator.

9. A system as in claim 8 wherein said first and second attachment members include a threaded collar rotatably mounted on one of said bodies.

* * * * *